(No Model.)
J. S. LEWIS.
INSULATOR.
No. 298,593. Patented May 13, 1884.
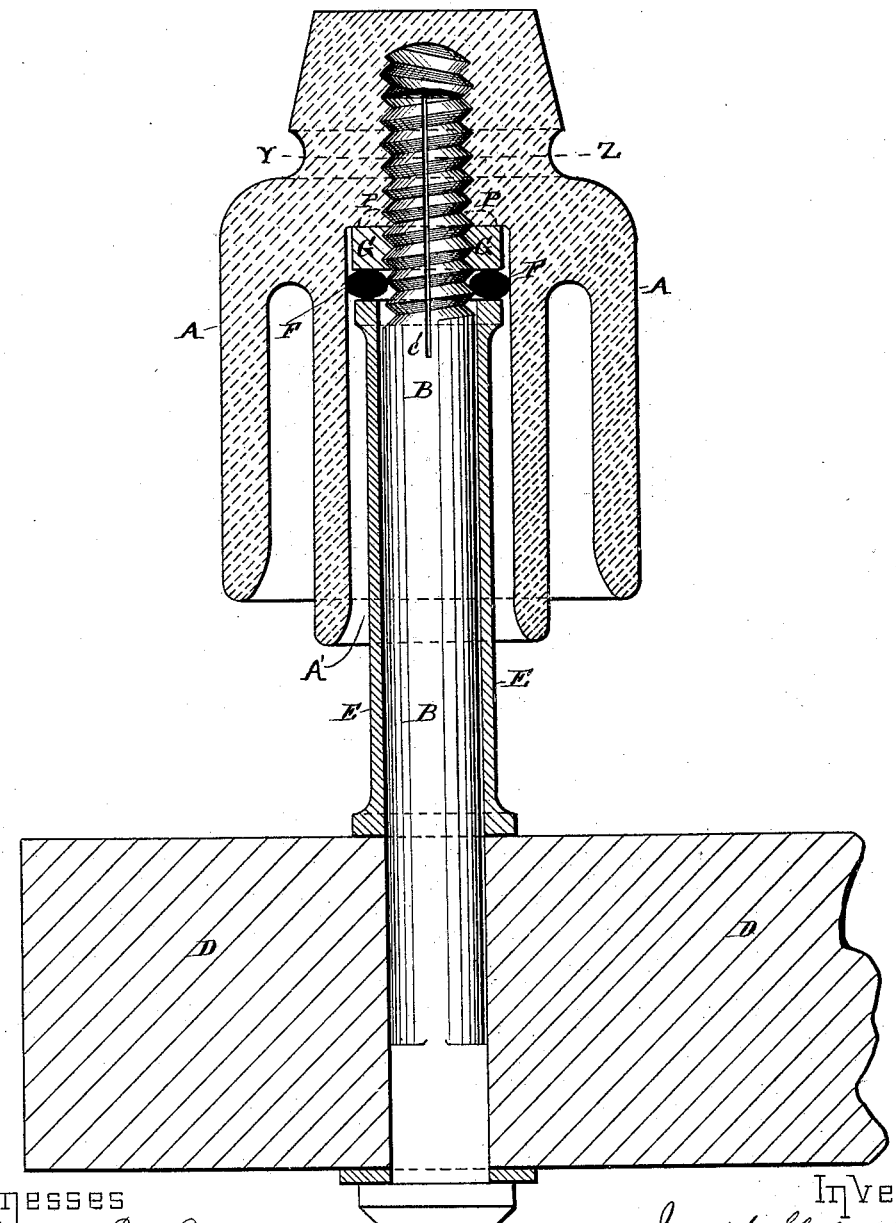
Witnesses
Carrie E. Davidson
Daniel W. Edgecomb
Inventor
Joseph Slater Lewis
by his atty's
Pope Edgecomb & Butler

UNITED STATES PATENT OFFICE.

JOSEPH SLATER LEWIS, OF BIRKENHEAD, COUNTY OF CHESTER, ASSIGNOR OF ONE-HALF TO WILLIAM PHILLIPS THOMPSON, OF LIVERPOOL, ENGLAND.

INSULATOR.

SPECIFICATION forming part of Letters Patent No. 298,593, dated May 13, 1884.

Application filed August 10, 1883. (No model.)

*To all whom it may concern:*

Be it known that I, JOSEPH SLATER LEWIS, a subject of the Queen of Great Britain, residing at Birkenhead, in the county of Chester and Kingdom of England, have invented certain new and useful Improvements in Insulators, of which the following is a specification.

The present form of line-insulator support, almost universal in England, is a double-ended bolt with two collars. One end is passed through the wooden telegraph-pole arm until the collar rests on the wood, and is fastened with a nut and washer. The other is screwed into the insulator, with sometimes an india-rubber washer between it and the insulator. Now, there are some serious defects in this arrangement: First, the nut is liable to rust fast on the bolt; consequently when the insulator has to be taken off great inconvenience is experienced, and often considerable damage is done and time wasted to release it. Second, the bolt having two collars on and two screwed ends is more difficult and costly to make than an ordinary bolt with a head and one screwed end, such as I use.

My invention is best described by the accompanying drawings, in which Figure 1 is an elevation part in section, and Fig. 2 a cross-section through Y Z of Fig. 1.

In these drawings, A is the insulator, preferably of my patent screw-head variety, patent No. 276,839, having an internal chamber, A'. B is an ordinary bolt, preferably made square at the base of the shank, as shown, or with a feather to prevent it turning in its support, and also split into four segments at the screwed end by two saw grooves or slots, $c'$ $c'$, at right angles to each other, and extending to below the point at which the screw enters the female screw of the insulator; D, wooden arm; E, pedestal or sleeve, of iron, earthenware, or other suitable material; F, rubber or yielding washer, and G nut. Either of these, or both, can be dispensed with, if desired.

The mode of installation is as follows: The bolt is pushed up through the telegraph-post arm till the head comes against the under side. The pedestal E is slid in over the bolt. The rubber or yielding ring F is then placed on and screwed down till it is squeezed out of shape, projecting beyond the nut or washer to a slightly-larger diameter than the hollow of the insulator. The insulator is now forced down over the rubber ring and screwed onto the bolt end till it comes down against the nut.

The rubber ring keeps moisture from entering to corrode the bolt. Should, however, moisture enter, the splits in bolt allow for the expansion of the bolt owing to the rust.

Sometimes I omit the nut and cut out a part of the insulator at the commencement of the screw-thread just big enough to hold about half the substance of the rubber ring, and shown in dotted lines P in the drawings. The insulator is then screwed home against the ring and pedestal, and the ring squeezed as much as possible into this cavity. This forms a very good protection for the bolt, as it forces the rubber into the part immediately around the bolt, and is much better than pressing the ring between two flat surfaces.

The nut serves several purposes: First, it bulges out and squeezes the washer and holds it in place, so as to shut out all air and damp from the screw; second, it screws down the bolt tight onto the arm, and thus makes it a firm, rigid stud to screw the insulator on, whereas when there is no nut the operator has to hold both bolt and insulator in screwing the latter up.

I also can, if desired, form the insulator and pedestal in one, and place the rubber washer above the post-arm.

I claim as my invention—

1. The combination of the ordinary bolt, B, the support D, and the pedestal E with the insulator A and the water-proof yielding washer F, substantially as and for the purposes specified.

2. The combination of the arm or support D with the bolt B, passing up through the same, pedestal E, and nut G, holding all tight, and the screwed end of the bolt exposed for attaching an insulator to, substantially as described.

3. The combination of the ordinary bolt, B, provided with the head and feather to keep it from turning in the support, the insulator A, having chamber A′, the support D, and the nut G with the water-proof or yielding washer F, filling the entire area of said internal chamber, substantially as and for the purposes specified.

4. The combination, with the insulator A, formed with the groove P, of a yielding washer, F, adapted to fit into said groove, the bolt B, and pedestal E, substantially as described.

5. The combination, substantially as hereinbefore set forth, of the insulator A, the bolt B, the nut G, and the pedestal or sleeve E.

In testimony whereof I have signed my name to this specification in the presence of two subscribing witnesses.

JOSEPH SLATER LEWIS.

Witnesses:
W. P. THOMPSON,
JOHN HAYES.